UNITED STATES PATENT OFFICE.

WILHELM HERZBERG, OF BERLIN, AND OSCAR SPENGLER, OF NIEDER-SCHÖNWEIDE, NEAR BERLIN, GERMANY, ASSIGNORS TO ACTIEN GESELLSCHAFT FÜR ANILIN FABRIKATION, OF BERLIN, GERMANY.

RED-ORANGE MONOAZO DYE AND PROCESS OF MAKING SAME.

No. 865,587.  Specification of Letters Patent.  Patented Sept. 10, 1907.

Application filed October 26, 1906. Serial No. 340,690.

*To all whom it may concern:*

Be it known that we, WILHELM HERZBERG and OSCAR SPENGLER, residing, respectively, at Berlin, Hagelsbergerstr. 10<sup>c</sup>, and Nieder-Schönweide, near Berlin, in the Kingdom of Prussia, German Empire, have invented new and useful Improvements in new Red-Orange Monoazo Dyestuffs and Processes of Making Same; and we do hereby declare that the following is a full, clear, and exact description thereof; which will enable others skilled in the art to which it appertains to make and use the same.

Our present invention relates to the manufacture of a new monoazo-dyestuff which may be obtained by diazotizing and then combining ortho-chloro-para-nitranilin with beta-naphthol it having been found that the product resulting from this azo-combination is distinguished by its very clear and brilliant red-orange tint and by an extremely great fastness to light. These advantageous qualities of the new product are present whatever may be the particular manner in which the dyestuff is made. For instance, when producing the dyestuff on a piece of cotton cloth, which manufacture occurs, generally speaking in the manner usual for the production of para-nitranilin red, there is obtained a clear brilliant red orange tint the fastness of which to light is much greater than that of para-nitranilin-red. On the other hand the dyestuff may be produced for instance in the presence of a substratum or of other suitable substances such as are used in the production of color-lakes, like aluminium hydroxid or a barium or calcium salt. In this case also the dyestuff or the lake respectively thus produced show a very clear and brilliant red-orange tint possessing a very great fastness to light; furthermore the lakes thus obtained are insoluble in water and practically insoluble in alcohol and in oil. They are most adapted for chromolithography as well as for paper-staining and for wall-paper printing.

The following examples may serve to illustrate our invention, the parts being by weight:

*Example 1:* 15 parts of beta-naphthol are dissolved in a suitable quantity of water by means of the calculated quantity of caustic soda; this solution is feebly acidulated with hydrochloric acid the beta-naphthol being thereby precipitated in a very fine distribution. To this mass is added while stirring well a diazo-solution of ortho-chloro-para-nitranilin which is prepared from 17,2 parts of this base by means of 7 parts of sodium nitrite and 35 parts of hydrochloric acid (20° Baumé specific gravity). Combination immediately occurs and is complete within a short time. The mass having been warmed on a water-bath it is filtered, washed and dried. Thus is obtained a clear red-orange powder of great brilliancy which is insoluble in water and in an aqueous solution of an alkali or of an acid; it dissolves in concentrated sulfuric acid to a violet solution which solution on addition of ice precipitates red flakes. The dyestuff dissolves in an alcoholic solution of caustic soda with a red coloration possessing a cast to violet. By the action of a strong reducing agent the dyestuff is split up yielding ortho-chloropara-nitranilin besides 1.2-amidonaphthol. It is convenient to say that the dyestuff shows its greatest brilliancy when the combination occurs in a solution the acid reaction of which is due to hydrochloric acid, but the production may also be performed in an acetic acid solution or in alkaline solution.

*Example 2: Production of the new azo-dyestuff in the presence of a suitable lake-substratum.*—17,2 parts of a chloro-para-nitranilin are diazotized in the usual manner by means of 7 parts of sodium nitrite and of 35 parts of hydrochloric acid of 20° Baumé specific gravity. The diazo-solution thus obtained is diluted with water up to about 500 parts and then added with 100 parts of an aqueous solution of barium-chlorid containing 20 per cent. of this salt. On the other hand there is prepared a solution of 14 parts of beta-naphthol in 600 parts of water by means of 10 parts of caustic soda lye (40° Baumé specific gravity); to this solution are added while stirring well 1,000 parts of a freshly prepared paste of aluminium hydroxid (containing 5 per cent. of this hydrate) as well as 20 parts of finely pulverized barium sulfate. Now the diazo-solution as above prepared is allowed to run into the beta-naphthol preparation. while stirring well. Combination occurs immediately, a clear and brilliant red-orange color-lake being formed; the reaction is complete within a short time. The mass is then filtered, washed and dried. The color-lake thus produced is a clear red-orange powder of great brilliancy, which is insoluble in water and practically insoluble in alcohol and oil. It is most adapted for chromolithography as well as for paper-staining and for wall-paper printing.

It is obvious to those skilled in the art that the present invention is not limited to the foregoing examples nor to the details given therein. First in applying the production of the new dyestuff to the manufacture of azo-colors on a vegetable fiber as for instance on cotton or on a vegetable fiber other than cotton the special conditions in every case are to be taken so as to suit the special kind of the respective vegetable fiber; Example 1 may therefore be varied within wide limits and may be adapted to the production of azo-colors on vegetable fiber without departing from the scope of the present invention. Furthermore when producing the new azo-dye in the presence of a lake substratum or lake substrata any other suitable substances such as are used in the production of color lakes may be used instead of the respective ingredients used in Example 2; also in this way there may be taken variations within wide limits without departing from the scope of the present invention.

It is obvious that the dyestuff may also be produced first without the presence of such a substratum or lake forming salt or compound and then precipitated on such a substratum or the like, as this is another method usual in the manufacture of color lakes.

Having now described our invention and the manner in which the same is to be carried out what we claim is,—

1. The process of producing a red-orange-monoazo-dyestuff, which process consists in diazotizing ortho-chloro-para-nitranilin and then combining the diazo-compound thus obtained with beta-naphthol.

2. As a new article of manufacture the red-orange monoazo-dyestuff which may be obtained by diazotizing ortho-chloro-para-nitranilin and combining the diazo compound thus obtained with beta-naphthol, which dyestuff is distinguished by its brilliancy and by a very great fastness to light and which dyestuff is insoluble in water and in an aqueous solution of an alkali or of an acid, and which dye dissolves in concentrated sulfuric acid with a violet coloration which solution on the addition of ice precipitates red flakes, this dyestuff being soluble in an alcoholic solution of caustic soda with a red coloration possessing a cast to violet and yielding by treatment with strong reducing agents ortho-chloro-para-nitranilin besides 1.2-amidonaphthol, and which dyestuff when the combination of the diazo-compound of ortho-chloro-para-nitranilin with beta-naphthol occurs in the presence of barium-chlorid together with aluminium-hydroxid and barium-sulfate forms a clear red-orange colored powder of great brilliancy, which powder is insoluble in water and practically insoluble in alcohol and in oil.

In witness whereof we have hereunto signed our name this 8" day of October, 1906, in the presence of two subscribing witnesses.

WILHELM HERZBERG.
OSCAR SPENGLER.

Witnesses:
HENRY HASPER,
WOLDEMAR HAUPT.